J. B. GAGNE.
AUTOMATIC HOSE COUPLING.
APPLICATION FILED DEC. 4, 1918.
1,316,153.
Patented Sept. 16, 1919.
2 SHEETS—SHEET 1.
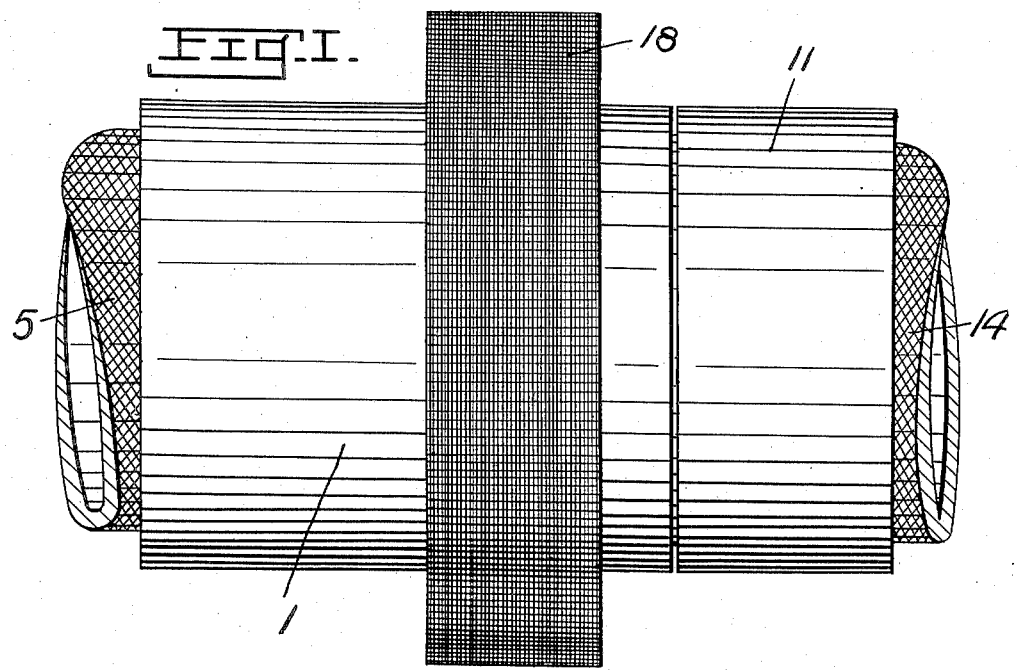
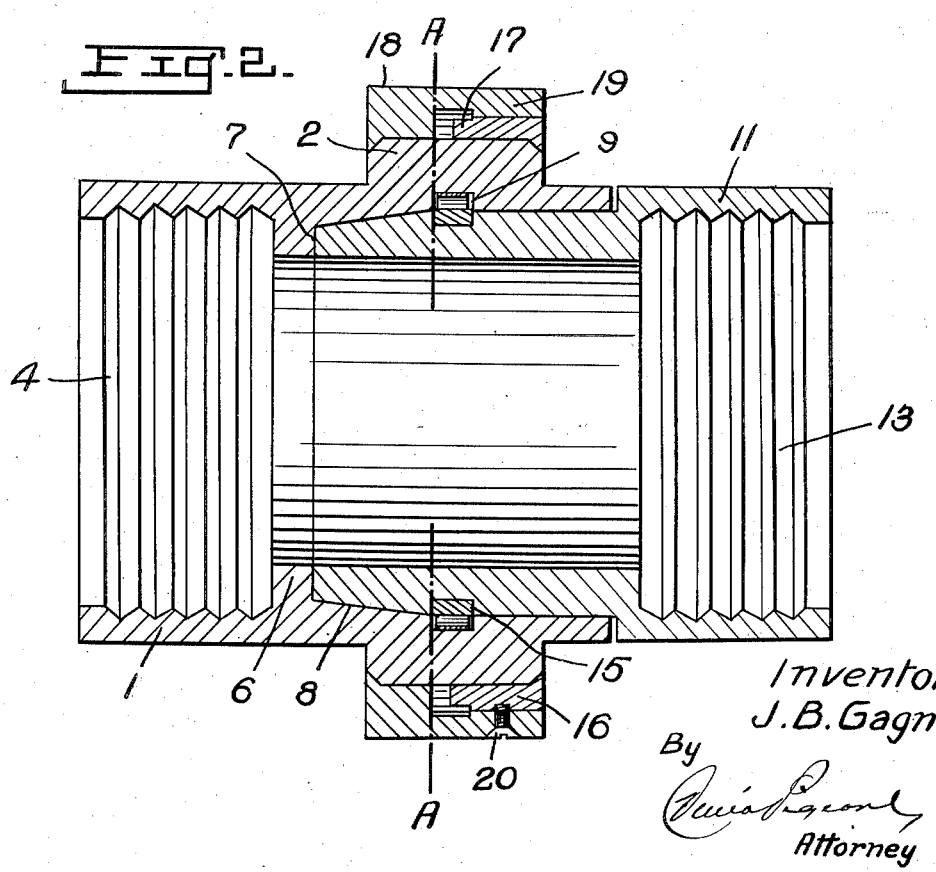
Inventor
J. B. Gagne
By
Attorney J. B. GAGNE.
AUTOMATIC HOSE COUPLING.
APPLICATION FILED DEC. 4, 1918.
1,316,153.
Patented Sept. 16, 1919.
2 SHEETS—SHEET 2.
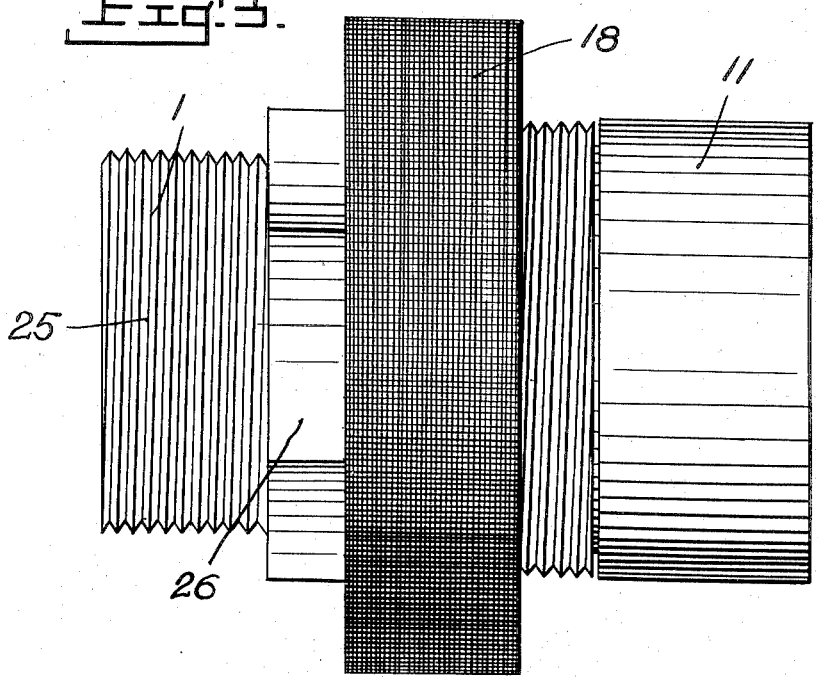
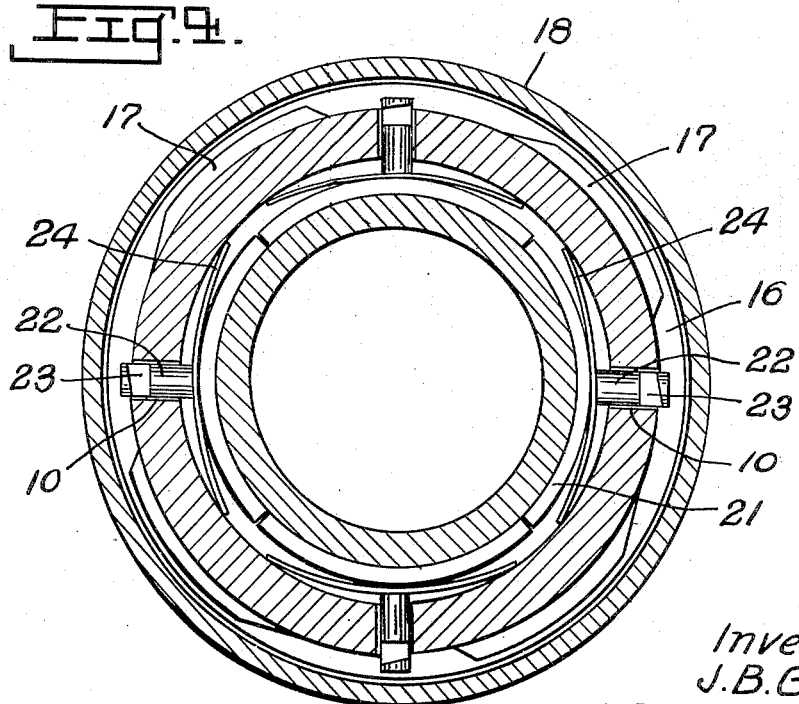
Inventor
J. B. Gagne
By
Attorney

UNITED STATES PATENT OFFICE.

JEAN BAPTISTE GAGNE, OF DONACONA, QUEBEC, CANADA.

AUTOMATIC HOSE-COUPLING.

1,316,153. Specification of Letters Patent. Patented Sept. 16, 1919.

Application filed December 4, 1918. Serial No. 265,287.

*To all whom it may concern:*

Be it known that I, JEAN BAPTISTE GAGNE, a British subject, residing at Donacona, in the Province of Quebec, in the Dominion of Canada, have invented certain new and useful Improvements in Automatic Hose-Couplings; and I do hereby declare that the following is a full, clear, and exact description of the same.

The present invention relates to improvements in hose couplings, and the main object of the invention is to provide a coupling cheap to manufacture, perfectly water proof and so constructed as to enable the interlocking members to automatically lock.

A further object of the invention is also to provide a coupling that can be easily and quickly uncoupled.

The invention will be better understood with the aid of the accompanying drawings in which:

Figure 1 is a side elevation of the coupling illustrating a portion of a hose connected at each end.

Fig. 2 is a longitudinal section through Fig. 1.

Fig. 3 is a slightly modified form of coupling preferably adapted to be secured to a hydrant.

Fig. 4 is a cross section on line A—A of Fig. 2.

Like numerals of reference indicate corresponding parts in each figure.

In the drawings, 1 is the female member of the coupling having the circumferential projection 2 intermediate thereof, said member being bored throughout and having at one end thereof the threaded portion 4 in which is secured one end of the hose 5.

The said bored portion is provided with an inner flange 6 of reduced diameter forming a seat 7, and adjacent to said flange 6 is provided a tapered bore 8 abutting at said flange.

Between said flange 6 and the outer edge of said bored portion is provided a circumferential groove 9 and a plurality of holes 10, located in said groove 9 and extending through said projection 2.

The male member 11 is bored throughout and threaded at 13, in which is secured the end of a hose 14, said bored portion being of the same diameter as the flange 6, the outer side of said member 11 being tapered and made to fit snugly in said tapered bore 8 and abut the seat 7.

The outer side of the member 11 is also provided with a circumferential groove 15 which mates with the groove 9.

16 is a collar adapted to fit over said projection 2 and having on its inner edge a plurality of bosses or lugs 17 (see Figs. 2 and 4), said collar projecting half way over said projection 2. 18 is another collar adapted to fit over the other half of said projection 2 and having an overlapping portion 19 which completely covers said collar 16. The collars 16 and 18 are so shaped that when they are secured together by the screw 20, they will be locked over the projection 2.

Within said groove 9 is provided a plurality of curved members 21 so as to completely fill in the groove 9, each of said members being provided with an outwardly projecting pin 22 which has a slot 23 adjacent its upper end. These pins 22 project through the holes 10 into the space left between the collars 18 and 16. 24 are flat springs adapted to press said curved members 21 into said groove 15 when the male member 11 is in position, so as to lock both coupling members together.

In the drawings the coupling is illustrated as locked, but it will easily be seen that to unlock both members, the collar 18 must be turned, thereby carrying with it the collar 16 and the lugs 17, which will naturally engage in the slots 23 in the pins 22 and lift the curved members 21, out of the groove 15.

In Fig. 3 a modified form of coupling is illustrated. The female coupling member 1 is adapted to fit on a hydrant and is provided with an outer threaded portion 25 to engage the usual threaded collar on the hydrant, and 26 is a square faced nut adapted to screw said member on the hydrant.

What I claim as my invention is:

1. A coupling comprising interfitting male and female members, one of which is provided with a groove and the other with a movable locking member normally engaged therein and having a projecting stem; and a ring loosely encircling said members and having a projection engageable with said stem when the ring is turned in one direction, to withdraw the locking member bodily from said groove.

2. A coupling comprising interfitting male and female members, one of which is provided with a groove and the other with an opening which leads transversely thereinto; a locking member normally engaged in said groove and having a lateral stem which projects loosely through said opening; and a ring rotatably encircling said members and having a projection engageable with said stem when the ring is turned in one direction, to withdraw the locking member bodily from said groove.

3. A coupling comprising interfitting male and female members, one of which is provided with a groove and the other with a movable locking member normally engaged therein and having a slotted stem; and a ring loosely encircling said members and having a projection engageable in the slot in said stem when the ring is turned in one direction, to cam the locking member bodily out of said groove.

4. A coupling comprising interfitting male and female members, one of which is provided with a groove and the other with an opening which leads transversely thereinto; a locking member normally engaged in said groove and having a lateral stem which projects loosely through said opening, and which is slotted adjacent its outer end; and a ring rotatably encircling said members and having a projection engageable in the slot in said stem when the ring is turned in one direction, to cam the locking member bodily out of said groove.

5. A coupling of the character described comprising female and male interlocking members, bored throughout, a seat provided in said female member against which the interlocking end of the male member is adapted to abut, said members having mating circumferential grooves therein, a locking member located in the groove in the male member and having a pin projecting therefrom through an opening leading from the groove to the female member, said pin having a slot in its upper end, a movable collar mounted over said female member and having a circumferential space on its inner side to receive the upper end of said pin, a spring to normally hold said locking member in operative position in its groove, and a lug adapted to engage the slot in said pin whereby said locking member will be pulled out from its groove when said movable collar is turned; substantially as described.

Signed at Montreal, Quebec, Canada, this 27th day of August, 1918.

JEAN BAPTISTE × GAGNE.
his mark

Witnesses:
A. P. DEAL.
C. PATENAUDE.